(12) United States Patent
Aoki

(10) Patent No.: US 8,206,831 B2
(45) Date of Patent: Jun. 26, 2012

(54) SILICONE PRESSURE-SENSITIVE ADHESIVE COMPOSITION

(75) Inventor: Shunji Aoki, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 457 days.

(21) Appl. No.: 12/477,206

(22) Filed: Jun. 3, 2009

(65) Prior Publication Data

US 2009/0305036 A1 Dec. 10, 2009

(30) Foreign Application Priority Data

Jun. 4, 2008 (JP) ................. 2008-147448

(51) Int. Cl.
| | | |
|---|---|---|
| B32B 7/12 | (2006.01) | |
| B32B 9/04 | (2006.01) | |
| C08F 283/12 | (2006.01) | |
| C08G 77/12 | (2006.01) | |
| C08G 77/20 | (2006.01) | |
| C08G 77/04 | (2006.01) | |
| C08G 77/16 | (2006.01) | |
| C08G 77/398 | (2006.01) | |
| C08L 83/04 | (2006.01) | |
| C08L 83/05 | (2006.01) | |
| C08L 83/06 | (2006.01) | |
| C08L 83/07 | (2006.01) | |

(52) U.S. Cl. .............. 428/447; 428/355 R; 428/356; 525/475; 525/477; 525/478; 528/31; 528/32; 528/33

(58) Field of Classification Search ............ 428/447, 428/355 R, 356; 525/477, 478, 475; 528/31, 528/32, 33
See application file for complete search history.

(56) References Cited

U.S. PATENT DOCUMENTS

| | | | | |
|---|---|---|---|---|
| 5,248,739 A | * | 9/1993 | Schmidt et al. | 525/477 |
| 5,366,809 A | * | 11/1994 | Schmidt et al. | 428/447 |
| 5,561,203 A | * | 10/1996 | Strong et al. | 525/477 |
| 6,121,368 A | * | 9/2000 | Heying et al. | 524/493 |
| 6,201,055 B1 | * | 3/2001 | Lutz et al. | 524/493 |
| 6,815,076 B2 | * | 11/2004 | Aoki | 428/448 |

FOREIGN PATENT DOCUMENTS

| | | |
|---|---|---|
| EP | 0 576 164 A2 | 12/1993 |
| JP | 7-11228 | 1/1995 |
| JP | 2008-24777 | 2/2008 |
| WO | WO 2004/111151 A2 * | 12/2004 |
| WO | WO 2008/081913 A1 * | 7/2008 |

* cited by examiner

Primary Examiner — Lorna M Douyon
(74) Attorney, Agent, or Firm — Oblon, Spivak, McClelland, Maier & Neustadt, L.L.P.

(57) ABSTRACT

This invention relates to a silicone pressure-sensitive adhesive composition including: (A) a polydiorganosiloxane composed of a linear polydiorganosiloxane (A1) having two or more alkenyl groups within each molecule and a linear polydiorganosiloxane (A2) having SiOH groups at terminals thereof and no alkenyl groups, which is represented by the formula $R^2{}_2(HO)SiO—(R^2{}_2SiO)_d—SiR^2{}_2(OH)$, wherein d represents an integer satisfying $500 \leq d \leq 20{,}000$; (B) a polyorganosiloxane including $R^3{}_3SiO_{1/2}$ units, $SiO_2$ units and Si atom-bonded hydroxyl group-containing units; (C) a polyorganohydrogensiloxane having three or more SiH groups within each molecule; (D) a reaction retarder; (E) a platinum group metal-based catalyst; and (F) a metal compound represented by formula $MY_x$, wherein the polyorganosiloxane (B) is condensed with the linear polydiorganosiloxane (A2). The composition exhibits powerful adhesive strength to silicone rubbers and is useful for, by example, producing a pressure-sensitive tape.

12 Claims, No Drawings

SILICONE PRESSURE-SENSITIVE ADHESIVE COMPOSITION

CROSS-REFERENCE TO RELATED APPLICATIONS

This application is based upon and claims the benefit of priority from prior Japanese Patent Application No.: 2008-147448 filed on Jun. 4, 2008.

BACKGROUND OF THE INVENTION

1. Field of the Invention

The present invention relates to a silicone pressure-sensitive adhesive composition and a pressure-sensitive adhesive tape using the same, and particularly to such a composition and pressure-sensitive adhesive tape that exhibit powerful adhesive strength to even silicone rubbers.

2. Description of the Prior Art

Pressure-sensitive adhesive tapes and pressure-sensitive adhesive labels that use a silicone pressure-sensitive adhesive contain a silicone pressure-sensitive adhesive layer that exhibits excellent levels of heat resistance, cold resistance, weather resistance, electrical insulation and chemical resistance, and they are therefore used under severe conditions, such as very high or very low temperatures, where organic resin-based pressure-sensitive adhesives such as acrylic pressure-sensitive adhesives or rubber-based pressure-sensitive adhesives would suffer deformation or degradation.

Moreover, silicone pressure-sensitive adhesives exhibit excellent adhesion to all manner of adherends, including a variety of surfaces that are difficult to bond using acrylic pressure-sensitive adhesives or rubber-based pressure-sensitive adhesives, such as silicone rubbers, silicone release papers, surfaces that have been coated with a release agent, water repellent agent, antifouling agent, paint or coating agent or the like that contains silicone, fluororesins, and surfaces that include a fluororesin component. Accordingly, silicone pressure-sensitive adhesives are ideal for use within pressure-sensitive adhesive tapes used for bonding or fixing a silicone rubber member to another member. However, in recent years there have been growing demands for pressure-sensitive adhesives that are capable of bonding together members of greater mass and capable of producing a bonded interface that is able to withstand greater impact than that achievable using conventional pressure-sensitive adhesives. Namely, there is a need to further improve the adhesive strength of silicone pressure-sensitive adhesives to silicone rubbers.

To provide a specific example, a silicone pressure-sensitive adhesive is used in the pressure-sensitive adhesive tape used for bonding the key tops to a silicone rubber key pad, and in order to ensure superior durability to repeated keystrokes, the pressure-sensitive adhesive tape must be resistant to peeling under all manner of environments from low temperature to high temperature.

When a pressure-sensitive adhesive tape that uses a conventional silicone pressure-sensitive adhesive is employed for the type of application described above, if the shape of the member being bonded is such that a satisfactory bonding surface area cannot be ensured, then detachment of the member may occur as a result of peeling of the pressure-sensitive adhesive tape.

On the other hand, silicone pressure-sensitive adhesive compositions containing an organosilicon compound having B—O—Si bonds are already known (see Patent Document 1), and it has been reported that these compositions provide improved adhesive strength to silicone rubbers, but these compositions have also suffered from inadequate adhesive strength to some silicone rubbers and reduced adhesive strength to adherends other than silicone rubbers.

Furthermore, silicone pressure-sensitive adhesive compositions that use a mixture of a polydiorganosiloxane containing alkenyl groups and a polyorganosiloxane containing no alkenyl groups are also known (see Patent Document 2), and it has been reported that these compositions also provide improved adhesive strength to silicone rubbers, but the adhesive strength of these compositions to silicone rubbers still tends to be inadequate.

Moreover, examples have been reported in which a metal salt of a carboxylic acid is added to a silicone pressure-sensitive adhesive composition to improve the stability of the composition at high temperatures, but there is no mention of a preferred embodiment for achieving superior adhesive strength to silicone rubbers (see Patent Document 3).

[Patent Document 1] JP 07-11228 A
[Patent Document 2] JP 2008-24777 A
[Patent Document 3] EP 0576164 A2

SUMMARY OF THE INVENTION

The present invention has an object of improving the circumstances described above by providing a silicone pressure-sensitive adhesive composition and pressure-sensitive adhesive tape that exhibit powerful adhesive strength to silicone rubbers.

As a result of intensive investigation aimed at achieving the above object, the inventors of the present invention discovered that by adding a specific metal compound to an addition reaction-curable silicone pressure-sensitive adhesive composition, a powerful adhesive strength could be achieved to silicone rubbers, and they were therefore able to complete the invention.

The present invention provides an addition reaction-curable silicone pressure-sensitive adhesive composition comprising:

(A) a polydiorganosiloxane composed of components (A1) and (A2) described below and having a mass ratio of (A1)/(A2) within a range from 100/0 to 10/90, in an amount of 20 to 80 parts by mass, (A1) a linear polydiorganosiloxane having two or more alkenyl groups within each molecule, (A2) a linear polydiorganosiloxane having SiOH groups at the terminals and having no alkenyl groups, (B) a polyorganosiloxane containing $R^3{}_3SiO_{0.5}$ units, $SiO_2$ units and Si atom-bonded hydroxyl group-containing siloxane units, having a molar ratio of $R^3{}_3SiO_{0.5}$ units/$SiO_2$ units within a range from 0.5 to 0.9 (wherein $R^3$ represents a monovalent hydrocarbon group of 1 to 10 carbon atoms), and containing the Si atom-bonded hydroxyl group in an amount of 0.1 to 5.0% by mass, in an amount of 80 to 20 parts by mass (provided that the combined total of component (A) and component (B) is 100 parts by mass), (C) a polyorganohydrogensiloxane containing three or more SiH groups within each molecule, in an amount such that the molar ratio of SiH groups within component (C) relative to alkenyl groups within component (A) is within a range from 0.5 to 20, (D) a reaction retarder, in an amount within a range from 0 to 8.0 parts by mass per 100 parts by mass of the combination of component (A) and component (B), (E) a platinum group metal-based catalyst, in an amount sufficient to provide a mass of the platinum group metal equivalent to 1 to 5,000 ppm relative to the combined mass of component (A) and component (B), and (F) at least one metal compound represented by a formula $MY_x$ (wherein M represents a metal element having an atomic valence of 3 or 4 selected from the group consisting of aluminum, titanium, zirconium and zinc, x represents a number equal to the atomic valence of the metal element M, and Y represents at least one ligand selected from the group consisting of RO, RCOO, RCOCHCOR and RCOCHCOOR (wherein R represents a substituted or unsubstituted monovalent hydrocarbon group of 1 to 10 carbon atoms)), in an amount of 0.5 to 8 parts by mass per 100 parts by mass of the combination of component (A) and component (B).

Furthermore, the present invention also provides a pressure-sensitive adhesive tape comprising a plastic film and a cured product layer of the above silicone pressure-sensitive adhesive composition laminated to at least one surface of the plastic film.

In a cured state, the silicone pressure-sensitive adhesive composition of the present invention exhibits powerful adhesive strength to silicone rubbers, and a pressure-sensitive adhesive tape having a layer of such a cured product is able to powerfully bond or fix a silicone rubber adherend.

DETAILED DESCRIPTION OF THE PREFERRED EMBODIMENTS

Detailed descriptions of each of the components of the silicone pressure-sensitive adhesive composition of the present invention are provided below. In the following description, when reference is made to the adhesive strength, tack, or holding power or the like of the silicone pressure-sensitive adhesive composition, these references refer to the adhesive strength, tack, or holding power of the cured state of the pressure-sensitive adhesive composition.

<Component (A)>

The component (A) is a linear polydiorganosiloxane composed of components (A1) and (A2) and having a mass ratio of (A1)/(A2) within a range from 100/0 to 10/90. The mass ratio of (A1)/(A2) is preferably within a range from 90/10 to 10/90, and is more preferably from 50/50 to 20/80.

The polydiorganosiloxane of component (A) may exist in either an oily state or a gum state. The viscosity of the component (A) at 25° C. is preferably at least 5,000 mPa·s but not more than 1,000,000 mPa·s in the case of an oil, whereas in the case of a gum, the viscosity of a solution prepared by dissolving the raw rubber in toluene to form a solution with a concentration of 30% is preferably within a range from 1,000 to 100,000 mPa·s. Gums for which the viscosity of this 30% solution is within a range from 3,000 to 60,000 mPa·s are particularly desirable. If the viscosity of this solution is less than 1,000 mPa·s, then the tack of the silicone pressure-sensitive adhesive composition tends to decrease, whereas if the viscosity exceeds 100,000 mPa·s, then the silicone pressure-sensitive adhesive composition tends to become overly viscous, and mixing the composition during production becomes difficult.

In this specification, viscosity values refer to values measured at 25° C. using a rotational viscometer.

The component (A1) is a linear polydiorganosiloxane having two or more alkenyl groups within each molecule, and includes compounds represented by formulas (1-1) and (1-2) shown below.

  (1-1)

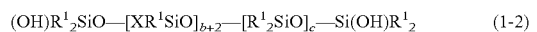  (1-2)

In each of the above formulas, $R^1$ represents identical or different monovalent hydrocarbon groups of 1 to 10 carbon atoms that contain no aliphatic unsaturated bonds, X represents identical or different alkenyl groups of 2 to 10 carbon atoms, a represents 0, 1 or 3, b represents an integer of 0 or greater, and c represents an integer of 0 or greater, provided that $2a+b \geq 2,500 \leq b+c \leq 20,000$.

In formulas (1-1) and (1-2), examples of $R^1$ include alkyl groups such as a methyl group, ethyl group, propyl group or butyl group, cycloalkyl groups such as a cyclohexyl group, and aryl groups such as a phenyl group or tolyl group, and of these, a methyl group or phenyl group is preferred. In those cases where the $R^1$ groups include phenyl groups, the phenyl groups preferably represent 0 to 30 mol % of all the organic groups within the polydiorganosiloxane represented by the formula (1-1) or (1-2). If this proportion exceeds 30 mol %, then the adhesive strength of the resulting pressure-sensitive adhesive composition to silicone rubbers may deteriorate. Examples of X include alkenyl groups such as a vinyl group, allyl group or hexenyl group, and of these, a vinyl group or hexenyl group is preferred, and a vinyl group is particularly desirable.

Of all of the siloxane units within the component (A1), 0.03 to 1 mol % of the units preferably include an alkenyl group, and this proportion is more preferably within a range from 0.05 to 0.30 mol % of the units. If this proportion is less than 0.03 mol %, then the curability of the resulting pressure-sensitive adhesive composition may be inadequate, whereas if the proportion exceeds 1 mol %, then satisfactory adhesive strength may be unobtainable.

The component (A1) may include a combination of two or more compounds.

The component (A2) is a linear polydiorganosiloxane having SiOH groups at the terminals and having no alkenyl groups, and includes compounds represented by a formula (2) shown below:

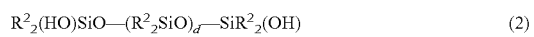  (2)

(wherein $R^2$ represents identical or different monovalent hydrocarbon groups of 1 to 10 carbon atoms that contain no aliphatic unsaturated bonds, and d represents an integer that satisfies $500 \leq d \leq 20,000$).

Examples of $R^2$ include alkyl groups such as a methyl group, ethyl group, propyl group or butyl group, cycloalkyl groups such as a cyclohexyl group, and aryl groups such as a phenyl group or tolyl group, and of these, a methyl group or phenyl group is preferred. In those cases where the $R^2$ groups include phenyl groups, the phenyl groups preferably represent 0 to 30 mol % of all the organic groups within the polydiorganosiloxane represented by the formula (2). If this proportion exceeds 30 mol %, then the adhesive strength of the resulting pressure-sensitive adhesive composition to silicone rubbers may deteriorate.

The component (A2) may include a combination of two or more compounds.

<Component (B)>

The component (B) is a polyorganosiloxane containing $R^3_3SiO_{0.5}$ units (wherein $R^3$ represents a monovalent hydrocarbon group of 1 to 10 carbon atoms), $SiO_2$ units, and Si atom-bonded hydroxyl group-containing siloxane units, wherein the molar ratio of $R^3_3SiO_{0.5}$ units/$SiO_2$ units is within a range from 0.5 to 0.9, and preferably from 0.6 to 0.8, and the content of said Si atom-bonded hydroxyl groups is in a range from 0.1 to 5.0% by mass. If this molar ratio of $R^3_3SiO_{0.5}$ units/$SiO_2$ units is less than 0.5, then the adhesive strength and/or tack of the resulting silicone pressure-sensitive adhesive composition may deteriorate, whereas if the molar ratio exceeds 0.9, then the adhesive strength and holding power may deteriorate. Examples of $R^3$ include alkyl groups such as a methyl group, ethyl group, propyl group or butyl group, cycloalkyl groups, a phenyl group, and alkenyl groups such as a vinyl group, allyl group or hexenyl group, and of these, a methyl group is preferred.

The component (B) contains OH groups in the siloxane units in the form of Si atom-bonded hydroxyl groups, and the content of the silanol group-containing siloxane units is in such an amount that the OH group content is in a range from at least 0.1% by mass but not more than 5.0% by mass, preferably from 0.3 to 3.0% by mass. If the OH group content exceeds 5.0% by mass, then the tack of the resulting silicone pressure-sensitive adhesive composition tends to decrease, which is undesirable. The Si atom-bonded hydroxyl group-containing siloxane units do not contain other substituents than hydroxyl groups, and include $(HO)SiO_{3/2}$, $(HO)_2SiO_{2/2}$ and $(HO)_3SiO_{1/2}$ units, which may be present singularly or in a combination of two or more.

Furthermore, $R^3SiO_{1.5}$ units and/or $R^3{}_2SiO$ units (wherein $R^3$ is as defined above) may also be included within the component (B) in amounts that do not impair the properties of the present invention. The total amount of the $R^3SiO_{1.5}$ units and $R^3{}_2SiO$ units should be not more than 20 mol %, preferably in a range from 0 mol % to 10 mol %. The component (B) may include a combination of two or more compounds.

<Component (A) and Component (B)>

The blend ratio between the component (A) and the component (B), expressed as a mass ratio, is typically within a range from 20/80 to 80/20, preferably from 30/70 to 60/40, and more preferably from 30/70 to 50/50. If the blend amount of the polydiorganosiloxane of the component (A) yields a ratio lower than 20/80, then the adhesive strength and the holding power of the resulting silicone pressure-sensitive adhesive composition tend to decrease, whereas if the ratio exceeds 80/20, then the adhesive strength and tack may deteriorate.

The components (A) and (B) may be used in the form of a simple mixture of the components (A1), (A2) and (B), or in the form of a condensation reaction product obtained by subjecting the components (A1), (A2) and (B) together to a condensation reaction. Alternatively, the condensation product of the components (A2) and (B) may be mixed with the component (A1). The component (A2) and the component (B) are preferably subjected to a condensation reaction in advance. More preferably, the components (A1), (A2) and (B) are subjected to a condensation reaction together in advance, as described above. The condensation reaction may be conducted by dissolving the mixture of the component (A) and the component (B) in a solvent such as toluene, subsequently reacting the mixture using an alkaline catalyst, at a temperature within a range from room temperature through to the reflux temperature, and then performing a neutralization if required.

Examples of the alkaline catalyst include metal hydroxides such as lithium hydroxide, sodium hydroxide, potassium hydroxide and calcium hydroxide; carbonates such as sodium carbonate and potassium carbonate; bicarbonates such as sodium bicarbonate and potassium bicarbonate; metal alkoxides such as sodium methoxide and potassium butoxide; organometallic compounds such as butyl lithium; potassium silanolate; and nitrogen compounds such as ammonia gas, ammonia water, methylamine, trimethylamine and triethylamine, and of these, ammonia gas or ammonia water is preferred. The temperature of the condensation reaction may be set within a range from 20 to 150° C., and is typically within a range from room temperature to the reflux tempera-ture of the organic solvent. Although there are no particular restrictions on the reaction time, the time is typically within a range from 0.5 to 20 hours, and is preferably from 1 to 10 hours.

Moreover, following completion of the reaction, if necessary, a neutralizing agent may be added to neutralize the alkaline catalyst. Examples of the neutralizing agent include acidic gases such as hydrogen chloride and carbon dioxide; organic acids such as acetic acid, octanoic acid and citric acid; and mineral acids such as hydrochloric acid, sulfuric acid and phosphoric acid.

<Component (C)>

The component (C) is a polyorganohydrogensiloxane containing three or more SiH groups within each molecule. Specific examples of the component (C) include compounds represented by a formula (3) shown below:

(wherein $R^4$ represents identical or different monovalent hydrocarbon groups of 1 to 10 carbon atoms that contain no aliphatic unsaturated bonds, e represents 0 or 1, f represents an integer of 1 or greater, and g represents an integer of 0 or greater, provided that $2e+f \geq 3$ and $1 \leq f+g \leq 1,000$).

Examples of $R^4$ include alkyl groups such as a methyl group, ethyl group, propyl group or butyl group; cycloalkyl groups such as a cyclohexyl group; and aryl groups such as a phenyl group or tolyl group, and of these, a methyl group or phenyl group is preferred, and a methyl group is particularly desirable. Moreover, polyorganohydrogensiloxanes having structures containing $[R^4SiO_{3/2}]$, $[HSiO_{3/2}]$ and/or $[SiO_{4/2}]$ units may also be used.

The viscosity of this polyorganohydrogensiloxane at 25° C. is typically within a range from 1 to 1,000 mPa·s, and preferably from 2 to 500 mPa·s. The component (C) may also be a mixture of two or more different polyorganohydrogensiloxanes.

Specific examples of the polyorganohydrogensiloxane described above include the compounds listed below.

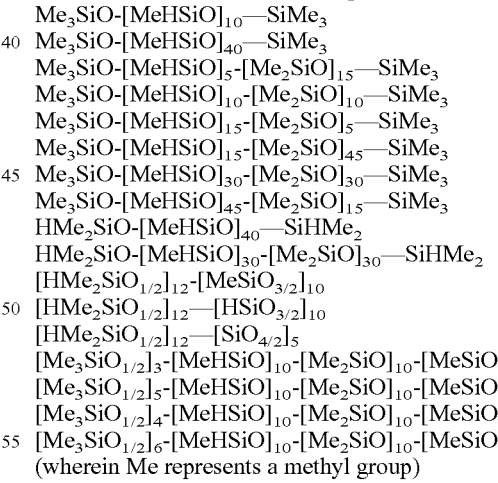

(wherein Me represents a methyl group)

The blend amount of the component (C) is sufficient that the molar ratio of SiH groups within the component (C) relative to alkenyl groups within the component (A) (namely, SiH groups/alkenyl groups) is within a range from 0.5 to 20, and preferably from 0.6 to 15. If this molar ratio is less than 0.5, then the cross-linking density decreases, which may result in a decrease in the holding force of the obtained pressure-sensitive adhesive composition, whereas if the molar ratio exceeds 20, then the adhesive strength and tack of the composition may decrease, and the pot life of the treatment liquid containing the pressure-sensitive adhesive composition may shorten. Moreover, no additional effects are achieved even if the molar ratio is increased beyond 20.

<Component (D)>

The component (D) is an addition reaction retarder, and is added to the composition to ensure that during preparation of the silicone pressure-sensitive adhesive composition, or during application of the composition to a substrate, the treatment liquid containing the pressure-sensitive adhesive composition does not undergo gelling or an increase in viscosity prior to heat curing.

Specific examples of the component (D) include:
3-methyl-1-butyn-3-ol,
3-methyl-1-pentyn-3-ol,
3,5-dimethyl-1-hexyn-3-ol,
1-ethynylcyclohexanol,
3-methyl-3-trimethylsiloxy-1-butyne,
3-methyl-3-trimethylsiloxy-1-pentyne,
3,5-dimethyl-3-trimethylsiloxy-1-hexyne,
1-ethynyl-1-trimethylsiloxycyclohexane,
bis(2,2-dimethyl-3-butynoxy)dimethylsilane,
1,3,5,7-tetramethyl-1,3,5,7-tetravinylcyclotetrasiloxane, and
1,1,3,3-tetramethyl-1,3-divinyldisiloxane.

The blend amount of the component (D) is typically within a range from 0 to 8.0 parts by mass, and preferably from 0.05 to 2.0 parts by mass, per 100 parts by mass of the combination of the components (A) and (B). If the blend amount exceeds 8.0 parts by mass, then the curability may deteriorate.

<Component (E)>

The component (E) is a platinum group metal-based catalyst, examples of which include chloroplatinic acid, alcohol solutions of chloroplatinic acid, reaction products of chloroplatinic acid and an alcohol, reaction products of chloroplatinic acid and an olefin compound, and reaction products of chloroplatinic acid and a vinyl group-containing siloxane, as well as catalysts containing metals such as ruthenium, rhodium, palladium and iridium. A platinum-based catalyst is preferred.

The amount added of the component (E), expressed as a mass of the platinum fraction relative to the combined mass of the components (A) and (B), is typically within a range from 1 to 5,000 ppm, preferably from 5 to 500 ppm, and more preferably from 10 to 200 ppm. If this amount is less than 1 ppm, then the cross-linking density may fall and the holding power may deteriorate, whereas if the amount exceeds 5,000 ppm, then the pot life for a treatment bath may become overly short.

<Component (F)>

The component (F) is at least one metal compound represented by the formula $MY_x$, wherein M represents a metal element having an atomic valence of 3 or 4 selected from the group consisting of titanium, aluminum, zirconium and zinc, and is preferably titanium or aluminum. x represents a number equal to the atomic valence of the metal element M, and Y represents at least one ligand selected from the group consisting of RO, RCOO, RCOCHCOR and RCOCHCOOR.

The RCOCHCOR and RCOCHCOOR are anionic ligands formed by elimination of one hydrogen atom from a β-diketone and a β-ketoester represented by formulas $RCOCH_2COR$ and $RCOCH_2COOR$, respectively. R represents a substituted or unsubstituted monovalent hydrocarbon group of 1 to 10 carbon atoms. Examples of the unsubstituted monovalent hydrocarbon group include alkyl groups such as a methyl group, ethyl group, propyl group or butyl group; cycloalkyl groups; a phenyl group; and alkenyl groups such as a vinyl group, allyl group or hexenyl group. These unsubstituted monovalent hydrocarbon groups may be substituted with an alkoxy group such as a methoxy group or ethoxy group, a hydroxyl group, an amino group, or a halogen atom such as a chlorine, bromine or fluorine atom.

The component (F) causes a condensation reaction at the interface between the pressure-sensitive adhesive and the adherend, between the SiOH groups and SiH groups and the like contained within the silicone pressure-sensitive adhesive composition of the present invention, and the SiOH groups and the like contained within the silicone rubber of the adherend. This condensation reaction forms cross-linking composed of Si—O—Si bonds or Si—O-M-O—Si bonds between the pressure-sensitive adhesive and the adherend, enabling a powerful adhesive strength to be achieved.

Preferred metal compounds for achieving the above purpose are as described above, and satisfactory effects are unobtainable using other metal compounds. Preferred values for the amount of the metal compound are discussed below, but amounts that are either too small or excessively large are unable to produce a satisfactory effect.

Specific examples of the metal compound are detailed below.

Examples of metal alkoxide compounds include $Ti(OR)_4$, $Al(OR)_3$, $Zr(OR)_4$ and $Zn(OR)_4$ (wherein R is as defined above, and is preferably an alkyl group). Specific examples include $Ti(OCH_3)_4$, $Ti(OC_3H_7)_4$, $Ti(OC_4H_9)_4$, $Al(OC_3H_7)_3$, $Zr(OC_3H_7)_4$ and $Zn(OC_3H_7)_4$.

Examples of metal chelate compounds include $TiL_4$, $AlL_3$, $ZrL_4$ and $ZnL_4$ (wherein L represents a ligand represented by RCOCHCOR or RCOCHCOOR, and R is as defined above and is preferably an alkyl group).

Specific examples of the β-diketone include acetylacetone, 2,4-hexanedione, 2,4-heptanedione, 3,5-heptanedione, 2,4-octanedione, 2,4-nonanedione, 5-methyl-2,4-hexanedione, and 2,2,6,6-tetramethyl-3,5-heptanedione.

Specific examples of the β-ketoester include methyl acetoacetate, ethyl acetoacetate, n-propyl acetoacetate, i-propyl acetoacetate, n-butyl acetoacetate, i-butyl acetoacetate, t-butyl acetoacetate, 2-ethylhexyl acetoacetate, and 2-methoxyethyl acetoacetate.

Specific examples of the metal chelate compounds include $Ti(acac)_4$, $Al(acac)_3$, $Zr(acac)_4$, $Zn(acac)_4$, $Ti(etac)_4$, $Al(etac)_3$, $Zr(etac)_4$ and $Zn(etac)_4$ (wherein acac represents an anionic ligand formed by elimination of one hydrogen atom from acetylacetone, and etac represents a ligand formed by elimination of one hydrogen atom from ethyl acetoacetate ($CH_3COCH_2COOC_2H_5$)).

Examples of metal carboxylate salts include $Ti(OCOR)_4$, $Al(OCOR)_3$, $Zr(OCOR)_4$ and $Zn(OCOR)_4$ (wherein R is as defined above and preferably represents an alkyl group).

Specific examples include the acetate salts, propionate salts, octanoate salts and 2-ethylhexanoate salts of the specified metals.

Examples of metal chelate alkoxide compounds include compounds represented by the average composition formulas shown below:

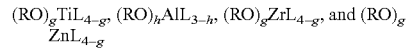

(wherein L is as defined above in the description of the metal chelate compounds, g represents a number of 0<g<4, and h is a number of 0<h<3).

Specific examples include $(iPrO)_2Ti(acac)_2$, $(nBuO)_1Al(acac)_2$, $(nBuO)_2Zr(etac)_2$, $(iPrO)_2Zn(acac)_2$, $(iPrO)_2Ti(etac)_2$, $(nBuO)_{1.5}Al(etac)_{1.5}$, $(iPrO)_2Zr(etac)_2$, and $(iPrO)_2Zn(etac)_2$.

(wherein iPr represents an isopropyl group, nBu represents an n-butyl group, and acac and etac are as defined above)

Of these metal compounds, metal chelate compounds, metal alkoxide compounds and metal chelate alkoxide compounds are preferred.

There are no particular restrictions on the form in which the component (F) is used. For example, the component (F) may be used in the form of a stand-alone compound, or in the form of a solution that has been diluted with an organic solvent. The component (F) may also employ a combination of two or more different compounds.

The blend amount of the component (F) is typically within a range from 0.5 to 8 parts by mass, and preferably from 1.5 to 5 parts by mass of the metal compound per 100 parts by mass of the combination of the components (A) and (B). If this amount is less than 0.5 parts by mass, then a satisfactory adhesive strength to silicone rubbers may be unattainable. In contrast, if the amount exceeds 8 parts by mass, then the tack or holding force of the resulting silicone pressure-sensitive adhesive composition may deteriorate.

The component (F) is usually incorporated within the silicone pressure-sensitive adhesive composition of the present invention by simply dispersing the component (F) uniformly within the composition by stirring.

The composition of the present invention is produced by mixing and dissolving the components (A), (B), (C), (D), (E) and (F). If required, a solvent described below may also be added.

Besides the components listed above, other optional components may also be added to the silicone pressure-sensitive adhesive composition of the present invention. Examples of other components that can be used include unreactive polyorganosiloxanes such as polydimethylsiloxanes and polydimethyldiphenylsiloxanes; antioxidants such as phenol-based, quinone-based, amine-based, phosphorus-based, phosphite-based, sulfur-based and thioether-based antioxidants; photostabilizers such as triazole-based and benzophenone-based photostabilizers; flame retardants such as phosphate ester-based, halogen-based, phosphorus-based and antimony-based flame retardants; antistatic agents such as cationic surfactants, anionic surfactants and nonionic surfactants; solvents that may be added to reduce the composition viscosity during coating, including aromatic solvents such as toluene and xylene, aliphatic solvents such as hexane, octane and isoparaffin, ketone-based solvents such as methyl ethyl ketone and methyl isobutyl ketone, ester-based solvents such as ethyl acetate and isobutyl acetate, ether based solvents such as diisopropyl ether and 1,4-dioxane, and mixed solvents thereof; dyes; and pigments.

A pressure-sensitive adhesive layer can be obtained by applying the silicone pressure-sensitive adhesive composition prepared in the above manner to any of a variety of substrates, and then conducting curing under predetermined conditions.

Examples of the substrate include plastic films of polyester, polytetrafluoroethylene, polyimide, polyphenylene sulfide, polyamide, polycarbonate, polystyrene, polypropylene, polyethylene or polyvinyl chloride or the like, metal foils such as aluminum foil or copper foil, papers such as Japanese washi paper, synthetic papers or polyethylene-laminated papers, cloth, glass fiber, or composite substrates prepared by laminating a plurality of the above substrates.

In order to further improve the adhesion between the substrate and the pressure-sensitive adhesive layer, the substrate may be subjected to a preliminary primer treatment, corona treatment, etching treatment, or plasma treatment or the like.

The coating method may employ conventional coating systems, and examples of devices that may be used include a comma coater, lip coater, roll coater, die coater, knife coater, blade coater, rod coater, kiss coater, gravure coater, as well as screen coating, dip coating and cast coating systems.

The coating amount may be set in accordance with the intended application, and is typically such that the thickness of the pressure-sensitive adhesive layer following curing is within a range from 2 to 200 µm, and preferably from 4 to 100 µm.

The curing conditions may be set to a temperature from 100 to 250° C. for a period of 10 seconds to 10 minutes, although the conditions are not restricted to these ranges.

A pressure-sensitive adhesive tape or the like may be produced by applying the silicone pressure-sensitive adhesive composition of the present invention directly to an aforementioned substrate, or alternatively, a pressure-sensitive adhesive tape may be produced by first applying the composition of the present invention to a release film or release paper with a releasable coating provided on the surface, conducting curing of the composition, and then transferring the resulting pressure-sensitive adhesive layer by bonding the surface of the pressure-sensitive adhesive layer to a substrate.

There are no particular restrictions on the types of adherend that can be bonded or fixed using a pressure-sensitive adhesive tape produced using a silicone pressure-sensitive adhesive composition of the present invention, and examples include silicone materials such as silicone rubbers, silicone sealants, silicone potting materials, silicone LIM materials and silicone varnishes; release papers or release films that have been coated with a silicone; metals plastics, wood materials, cloth or papers that have been coated with a silicone coating material, silicone release agent, silicone water repellent agent, or other coating material containing a silicone; and composite materials formed using a plurality of these materials. The adherend is preferably a rubber-based adherend such as a silicone rubber, silicone sealant or silicone LIM material.

EXAMPLES

The present invention is described in more detail below using a series of examples and comparative examples, although the present invention is in no way limited by the examples presented below. In the examples, viscosity values refer to values measured at 25° C., "parts" refer to "parts by mass", and the values reported for the various properties refer to measured values obtained using the test methods described below. Furthermore, Me represents a methyl group, Vi represents a vinyl group, nBuO represents an n-butoxy group, iPrO represents an isopropoxy group, and acac and etac are as defined above.

Each composition prepared in the following examples was measured for adhesive strength, adhesive strength to silicone, and holding force, using the measurement methods described below.

Adhesive Strength

A solution of the silicone pressure-sensitive adhesive composition was applied with an applicator to a polyester film of thickness 25 µm and width 25 mm, in an amount sufficient to generate a cured layer of thickness 30 µm, and the composition was then cured by heating at 130° C. for 1 minute, thus forming a pressure-sensitive adhesive tape. This pressure-sensitive adhesive tape was bonded to a polished stainless steel sheet, and was then pressure bonded by rolling a 2 kg roller coated with a rubber layer once back and forth across the tape. Following standing for approximately 2 hours at 23° C., one end of the pressure-sensitive adhesive tape was detached from the stainless steel sheet and grasped, and the force (N/25 mm) required to peel the tape away from the stainless steel sheet at a speed of 300 mm/minute and an angle of 180° was measured using a tensile tester.

Adhesive Strength to Silicone

A pressure-sensitive adhesive tape was prepared in the same manner as that described above in relative to the adhesive strength measurement. This pressure-sensitive adhesive tape was bonded to a silicone rubber sheet of thickness 2 mm (prepared by curing KE951U (a product name), manufactured by Shin-Etsu Chemical Co., Ltd.), and was then pressure bonded by rolling a 2 kg roller coated with a rubber layer once back and forth across the tape. Following standing for approximately 2 hours at room temperature, one end of the pressure-sensitive adhesive tape was detached from the silicone rubber sheet and grasped, and the force (N/25 mm) required to peel the tape away from the silicone sheet at a speed of 300 mm/minute and an angle of 180° was measured using a tensile tester.

Holding Force

A pressure-sensitive adhesive tape was prepared using the same method as that described above for the adhesive strength measurement. This pressure-sensitive adhesive tape was bonded to the bottom end of a stainless steel plate using an adhesion surface area of 25×25 mm, a 1 kg weight was suspended from the bottom edge of the pressure-sensitive adhesive tape, and the degree of movement (mm) in the tape following standing in a vertical state for 1 hour at 150° C. was measured using a microscope.

Synthesis Example 1

A solution composed of a polydimethylsiloxane having a viscosity of 48,000 mPa·s when dissolved in toluene to form a solution with a concentration of 30% by mass, having both molecular chain terminals blocked with vinyl groups, and containing vinyl groups within 0.08 mol % of all the siloxane units, represented by the formula shown below (45.0 parts):

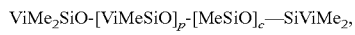
ViMe$_2$SiO-[ViMeSiO]$_p$-[MeSiO]$_c$—SiViMe$_2$, (wherein p and c are numbers that meet the conditions on the viscosity and the amount of vinyl groups mentioned above), a 60% by mass toluene solution of a polysiloxane composed of Me$_3$SiO$_{0.5}$ units, SiO$_2$ units and silanol group-containing siloxane units (wherein Me$_3$SiO$_{0.5}$ units/SiO$_2$ units on a molar basis was 0.75, and the silanol group content was 1.5% by mass) (91.7 parts), toluene (30 parts) and ammonia water (0.5 parts) was stirred for 12 hours at room temperature. Subsequently, the solution was heated for 6 hours under reflux, and the ammonia and water were removed by evaporation. Thus, a condensation reaction was proceeded. Following cooling a reaction product thus obtained, to the reaction product, a polyhydrosiloxane represented by a formula shown below (0.29 parts):

Me$_3$SiO-[MeHSiO]$_{40}$—SiMe$_3$ (wherein p and c are numbers that meet the conditions on the viscosity and the amount of vinyl groups mentioned above), and ethynylcyclohexanol (0.2 parts) were added, and sufficient toluene was added to generate a solution with a nonvolatile fraction of 60%, thus completing preparation of a silicone pressure-sensitive adhesive base composition A.

Synthesis Example 2

A solution composed of a polydimethylsiloxane having a viscosity of 48,000 mPa·s when dissolved in toluene to form a solution with a concentration of 30% by mass, having both molecular chain terminals blocked with vinyl groups, and containing vinyl groups within 0.08 mol % of all the siloxane units, represented by the formula shown below (14 parts):

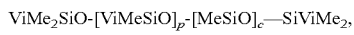
ViMe$_2$SiO-[ViMeSiO]$_p$-[MeSiO]$_c$—SiViMe$_2$, a polydimethylsiloxane having a viscosity of 70,000 mPa·s when dissolved in toluene to form a solution with a concentration of 30% by mass, having both molecular chain terminals blocked with OH groups, and containing no alkenyl groups, represented by the formula shown below (21 parts):

(OH)Me$_2$SiO-[MeSiO]$_c$—Si(OH)Me$_2$, a 60% by mass toluene solution of a polysiloxane composed of Me$_3$SiO$_{0.5}$ units and SiO$_2$ units and silanol group-containing siloxane units (wherein Me$_3$SiO$_{0.5}$ units/SiO$_2$ units on a molar basis was 0.70, and the silanol group content was 1.0% by mass) (108.3 parts), toluene (23.4 parts) and ammonia water (0.5 parts) was stirred for 12 hours at room temperature. Subsequently, the solution was heated for 6 hours under reflux, and the ammonia and water were removed by evaporation. Thus, a condensation reaction was proceeded. Following cooling a reaction product thus obtained, to the reaction product, a polyhydrosiloxane represented by a formula shown below (0.090 parts):

Me$_3$SiO-[MeHSiO]$_{40}$—SiMe$_3$ and ethynylcyclohexanol (0.2 parts) were added, and sufficient toluene was added to generate a solution with a nonvolatile fraction of 60%, thus completing preparation of a silicone pressure-sensitive adhesive base composition B.

Example 1

To the silicone pressure-sensitive adhesive base composition A (solid fraction: approximately 60% by mass) (166.7 parts) was added and mixed (nBuO)$_{1.5}$Al(etac)$_{1.5}$ (3.0 parts) (equivalent to 3.0 parts, or a metal fraction of 0.25 parts, per 100 parts of the combination of components (A) and (B)).

To the resulting mixture (siloxane fraction: 60% by mass) (100 parts) were added and mixed toluene (50 parts) and a toluene solution of a platinum-vinyl group-containing siloxane complex (0.5 parts) (manufactured by Shin-Etsu Chemical Co., Ltd.) having a platinum metal content of 0.5% by mass, thus completing preparation of a silicone pressure-sensitive adhesive composition (solid fraction: approximately 40% by mass). The adhesive strength, adhesive strength to silicone, and holding force for this silicone pressure-sensitive adhesive composition were measured. The results are shown in Table 1.

Example 2

With the exception of replacing the (nBuO)$_{1.5}$Al(etac)$_{1.5}$ (3.0 parts) from example 1 with (iPrO)$_2$Ti(acac)$_2$ (3.0 parts) (equivalent to 3.0 parts, or a metal fraction of 0.39 parts, per 100 parts of the combination of components (A) and (B)), a silicone pressure-sensitive adhesive composition was prepared in the same manner as example 1. The adhesive strength, adhesive strength to silicone, and holding force for this silicone pressure-sensitive adhesive composition were measured. The results are shown in Table 1.

Example 3

With the exception of replacing the (nBuO)$_{1.5}$Al(etac)$_{1.5}$ (3.0 parts) from example 1 with Ti(OCOC$_7$H$_{15}$)$_4$ (3.0 parts) (equivalent to 3.0 parts, or a metal fraction of 0.23 parts, per 100 parts of the combination of components (A) and (B)), a silicone pressure-sensitive adhesive composition was prepared in the same manner as example 1. The adhesive strength, adhesive strength to silicone, and holding force for this silicone pressure-sensitive adhesive composition were measured. The results are shown in Table 1.

Example 4

With the exception of replacing the (nBuO)$_{1.5}$Al(etac)$_{1.5}$ (3.0 parts) from example 1 with Zn(OCOC$_7$H$_{15}$)$_4$ (3.0 parts) (equivalent to 3.0 parts, or a metal fraction of 0.31 parts, per 100 parts of the combination of components (A) and (B)), a silicone pressure-sensitive adhesive composition was prepared in the same manner as example 1. The adhesive strength, adhesive strength to silicone, and holding force for this silicone pressure-sensitive adhesive composition were measured. The results are shown in Table 1.

Example 5

To the silicone pressure-sensitive adhesive base composition B (solid fraction: approximately 60% by mass) (166.7 parts) was added and mixed Al(acac)$_3$ (4.5 parts) (equivalent to 4.5 parts, or a metal fraction of 0.37 parts, per 100 parts of the combination of components (A) and (B)).

To the resulting mixture (siloxane fraction: 60% by mass) (100 parts) were added and mixed toluene (50 parts) and a toluene solution of a platinum-vinyl group-containing siloxane complex (0.5 parts) (manufactured by Shin-Etsu Chemical Co., Ltd.) having a platinum metal content of 0.5% by mass, thus completing preparation of a silicone pressure-sensitive adhesive composition (solid fraction: approximately 40% by mass). The adhesive strength, adhesive strength to silicone, and holding force for this silicone pressure-sensitive adhesive composition were measured. The results are shown in Table 1.

Example 6

With the exception of replacing the Al(acac)$_3$ (4.5 parts) from example 5 with (nBuO)$_{1.5}$Al(etac)$_{1.5}$ (3.0 parts) (equivalent to 3.0 parts, or a metal fraction of 0.25 parts, per 100 parts of the combination of components (A) and (B)), a silicone pressure-sensitive adhesive composition was prepared in the same manner as example 5. The adhesive strength, adhesive strength to silicone, and holding force for this silicone pressure-sensitive adhesive composition were measured. The results are shown in Table 1.

Example 7

With the exception of replacing the Al(acac)$_3$ (4.5 parts) from example 5 with (iPrO)$_2$Ti(acac)$_2$ (3.0 parts) (equivalent to 3.0 parts, or a metal fraction of 0.39 parts, per 100 parts of the combination of components (A) and (B)), a silicone pressure-sensitive adhesive composition was prepared in the same manner as example 5. The adhesive strength, adhesive strength to silicone, and holding force for this silicone pressure-sensitive adhesive composition were measured. The results are shown in Table 1.

Example 8

With the exception of replacing the Al(acac)$_3$ (4.5 parts) from example 5 with Ti(acac)$_4$ (3.0 parts) (equivalent to 3.0 parts, or a metal fraction of 0.32 parts, per 100 parts of the combination of components (A) and (B)), a silicone pressure-sensitive adhesive composition was prepared in the same manner as example 5. The adhesive strength, adhesive strength to silicone, and holding force for this silicone pressure-sensitive adhesive composition were measured. The results are shown in Table 1.

Example 9

With the exception of replacing the Al(acac)$_3$ (4.5 parts) from example 5 with Ti(nBuO)$_4$ (1.5 parts) (equivalent to 1.5 parts, or a metal fraction of 0.21 parts, per 100 parts of the combination of components (A) and (B)), a silicone pressure-sensitive adhesive composition was prepared in the same manner as example 5. The adhesive strength, adhesive strength to silicone, and holding force for this silicone pressure-sensitive adhesive composition were measured. The results are shown in Table 1.

Example 10

With the exception of replacing the Al(acac)$_3$ (4.5 parts) from example 5 with Zr(acac)$_4$ (3.0 parts) (equivalent to 3.0 parts, or a metal fraction of 0.56 parts, per 100 parts of the combination of components (A) and (B)), a silicone pressure-sensitive adhesive composition was prepared in the same manner as example 5. The adhesive strength, adhesive strength to silicone, and holding force for this silicone pressure-sensitive adhesive composition were measured. The results are shown in Table 1.

Comparative Example 1

With the exception of not adding the (nBuO)$_{1.5}$Al(etac)$_{1.5}$ (3.0 parts), a silicone pressure-sensitive adhesive composition was prepared in the same manner as example 1. The adhesive strength, adhesive strength to silicone, and holding force for this silicone pressure-sensitive adhesive composition were measured. The results are shown in Table 1.

Comparative Example 2

With the exception of not adding the Al(acac)$_3$ (4.5 parts), a silicone pressure-sensitive adhesive composition was prepared in the same manner as example 5. The adhesive strength, adhesive strength to silicone, and holding force for this silicone pressure-sensitive adhesive composition were measured. The results are shown in Table 1.

Comparative Example 3

With the exception of replacing the (nBuO)$_{1.5}$Al(etac)$_{1.5}$ (3.0 parts) from example 1 with A(OCOC$_7$H$_{15}$)$_3$ [product name: Octope 6% R, a mineral turpentine solution of rare earth 2-ethylhexanoates (having a metal fraction of 6% by mass, containing approximately 24% by mass of metal compounds, and including, as the metal element "A", cerium, lanthanum, neodymium, promethium, samarium, ytterbium and gadolinium and the like), manufactured by Hope Chemical Co., Ltd.] (12.5 parts), a silicone pressure-sensitive adhesive composition was prepared in the same manner as example 1. The adhesive strength, adhesive strength to silicone, and holding force for this silicone pressure-sensitive adhesive composition were measured. The results are shown in Table 1.

Comparative Example 4

With the exception of replacing the Al(acac)$_3$ (4.5 parts) from example 5 with a borosiloxane represented by an average composition formula shown below (3.0 parts):

$(Me_2SiO)_{0.8}(i\text{-}C_4H_9SiO_{1.5})_{0.1}(BO_{1.5})_{0.1}$ a silicone pressure-sensitive adhesive composition was prepared in the same manner as example 5. The adhesive strength, adhesive strength to silicone, and holding force for this silicone pressure-sensitive adhesive composition were measured. The results are shown in Table 1.

TABLE 1

|  | Example |  |  |  |  |  |  |
|---|---|---|---|---|---|---|---|
|  | 1 | 2 | 3 | 4 | 5 | 6 | 7 |
| Silicone pressure-sensitive adhesive base composition A | 166.7 | 166.7 | 166.7 | 166.7 | — | — | — |
| Silicone pressure-sensitive adhesive base composition B | — | — | — | — | 166.7 | 166.7 | 166.7 |
| $Al(acac)_3$ | — | — | — | — | 4.5 | — | — |
| $(nBuO)_{1.5}Al(etac)_{1.5}$ | 3.0 | — | — | — | — | 3.0 | — |
| $(iPrO)_2Ti(acac)_2$ | — | 3.0 | — | — | — | — | 3.0 |
| $Ti(acac)_4$ | — | — | — | — | — | — | — |
| $Ti(OBu)_4$ | — | — | — | — | — | — | — |
| $Ti(OCOC_7H_{15})_4$ | — | — | 3.0 | — | — | — | — |
| $Zr(acac)_4$ | — | — | — | — | — | — | — |
| $Zn(OCOC_7H_{15})_4$ | — | — | — | 3.0 | — | — | — |
| $A(OCOC_7H_{15})_3$ | — | — | — | — | — | — | — |
| borosiloxane | — | — | — | — | — | — | — |
| Adhesive strength (N/25 mm) | 7.0 | 6.3 | 7.2 | 7.4 | 6.1 | 6.5 | 6.2 |
| Adhesive strength to silicone rubber (N/25 mm) | 7.6 | 9.5 | 6.8 | 6.8 | 9.1 | 7.8 | 7.3 |
| Holding force (mm) | 0.03 | 0.06 | 0.10 | 0.05 | 0.08 | 0.12 | 0.16 |

|  | Example |  |  | Comparative example |  |  |  |
|---|---|---|---|---|---|---|---|
|  | 8 | 9 | 10 | 1 | 2 | 3 | 4 |
| Silicone pressure-sensitive adhesive base composition A | — | — | — | 166.7 | — | 166.7 | — |
| Silicone pressure-sensitive adhesive base composition B | 166.7 | 166.7 | 166.7 | — | 166.7 | — | 166.7 |
| $Al(acac)_3$ | — | — | — | — | — | — | — |
| $(nBuO)_{1.5}Al(etac)_{1.5}$ | — | — | — | — | — | — | — |
| $(iPrO)_2Ti(acac)_2$ | — | — | — | — | — | — | — |
| $Ti(acac)_4$ | 3.0 | — | — | — | — | — | — |
| $Ti(OBu)_4$ | — | 1.5 | — | — | — | — | — |
| $Ti(OCOC_7H_{15})_4$ | — | — | — | — | — | — | — |
| $Zr(acac)_4$ | — | — | 3.0 | — | — | — | — |
| $Zn(OCOC_7H_{15})_4$ | — | — | — | — | — | — | — |
| $A(OCOC_7H_{15})_3$ | — | — | — | — | — | 12.5 | — |
| borosiloxane | — | — | — | — | — | — | 3.0 |
| Adhesive strength (N/25 mm) | 6.0 | 6.8 | 6.0 | 6.7 | 7.0 | 6.9 | 4.2 |
| Adhesive strength to silicone rubber (N/25 mm) | 7.0 | 6.6 | 7.5 | 3.6 | 4.6 | 5.1 | 5.3 |
| Holding force (mm) | 0.14 | 0.21 | 0.18 | 0.01 | 0.15 | 0.09 | 0.10 |

What is claimed is:

1. An addition reaction-curable silicone pressure-sensitive adhesive composition, comprising:
   (A) a polydiorganosiloxane comprising a linear polydiorganosiloxane (A1) and a linear polydiorganosiloxane (A2) having a mass ratio of (A1)/(A2) within a range from 90/10 to 10/90, in an amount of 20 to 80 parts by mass, wherein
      (A1) the linear polydiorganosiloxane (A1) comprises two or more alkenyl groups within each molecule, and
      (A2) the linear polydiorganosiloxane (A2) comprises SiOH groups at terminals thereof and no alkenyl groups, and is represented by formula (2):

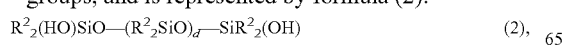
   $$R^2_2(HO)SiO—(R^2_2SiO)_d—SiR^2_2(OH) \quad (2),$$

wherein $R^2$ represents identical or different monovalent hydrocarbon groups of 1 to 10 carbon atoms that contain no aliphatic unsaturated bonds, and d represents an integer that satisfies $500 \leq d \leq 20,000$;

(B) a polyorganosiloxane comprising $R^3_3SiO_{0.5}$ units, $SiO_2$ units and Si atom-bonded hydroxyl group-containing siloxane units, having a molar ratio of $R^3_3SiO_{0.5}$ units/$SiO_2$ units within a range from 0.5 to 0.9, wherein $R^3$ represents a monovalent hydrocarbon group of 1 to 10 carbon atoms, and containing the Si atom-bonded hydroxyl group in an amount of 0.1 to 5.0% by mass, in an amount of 80 to 20 parts by mass, provided that the combined total of the polydiorganosiloxane (A) and the polyorganosiloxane (B) is 100 parts by mass;

(C) a polyorganohydrogensiloxane comprising three or more SiH groups within each molecule, in an amount such that a molar ratio of SiH groups within the polyorganohydrogensiloxane (C) relative to alkenyl groups within the polydiorganosiloxane (A) is within a range from 0.5 to 20;

(D) a reaction retarder, in an amount within a range from 0 to 8.0 parts by mass per 100 parts by mass of a combination of the polydiorganosiloxane (A) and the polyorganosiloxane (B);

(E) a platinum group metal-based catalyst, in an amount sufficient to provide a mass of the platinum group metal equivalent to 1 to 5,000 ppm relative to a combined mass of the polydiorganosiloxane (A) and the polyorganosiloxane (B); and (F) a metal compound represented by a formula $MY_x$, wherein M represents a metal element having an atomic valence of 3 or 4 selected from the group consisting of aluminum, titanium, zirconium and zinc, x represents a number equal to the atomic valence of the metal element M, Y represents at least one ligand selected from the group consisting of RO, RCOO, RCOCHCOR and RCOCHCOOR, and R represents a substituted or unsubstituted monovalent hydrocarbon group of 1 to 10 carbon atoms, in an amount of 0.5 to 8 parts by mass per 100 parts by mass of a combination of the polydiorganosiloxane (A) and the polyorganosiloxane (B), wherein the polyorganosiloxane (B) is condensed with the linear polydiorganosiloxane (A2).

2. The composition of claim 1, wherein the linear polydiorganosiloxane (A1) is a polydiorganosiloxane represented by formula (1-1) or (1-2):

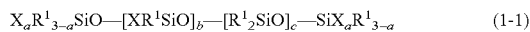

$$X_a R^1_{3-a}SiO-[XR^1SiO]_b-[R^1_2SiO]_c-SiX_a R^1_{3-a} \quad (1\text{-}1)$$

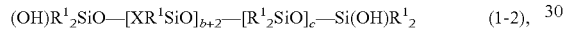

$$(OH)R^1_2SiO-[XR^1SiO]_{b+2}-[R^1_2SiO]_c-Si(OH)R^1_2 \quad (1\text{-}2),$$

wherein in each of the formulae (1-1) and (1-2), $R^1$ represents identical or different monovalent hydrocarbon groups of 1 to 10 carbon atoms that contain no aliphatic unsaturated bonds, X represents identical or different alkenyl groups of 2 to 10 carbon atoms, a represents 0, 1 or 3, b represents an integer of 0 or greater, and c represents an integer of 0 or greater, provided that $2a+b \geq 2$, and $500 \leq b+c \leq 20,000$.

3. The composition of claim 1, wherein the polyorganohydrogensiloxane (C) is an organohydrogenpolysiloxane represented by formula (3):

$$H_e R^4_{3-e}SiO-[HR^4SiO]_f-[R^4_2SiO]_g-SiH_e R^4_{3-e} \quad (3),$$

wherein $R^4$ represents identical or different monovalent hydrocarbon groups of 1 to 10 carbon atoms that contain no aliphatic unsaturated bonds, e represents 0 or 1, f represents an integer of 1 or greater, and g represents an integer of 0 or greater, provided that $2e+f \geq 3$ and $1 \leq f+g \leq 1,000$.

4. The composition of claim 1, wherein the metal element M is aluminum or titanium.

5. The composition of claim 1, wherein the ligand Y is at least one selected from the group consisting of RO, RCOCHCOR and RCOCHCOOR, wherein R represents a substituted or unsubstituted monovalent hydrocarbon group of 1 to 10 carbon atoms.

6. The composition of claim 1, wherein
the metal compound (F) is a compound represented by a formula: $Ti(OR)_4$, $Al(OR)_3$, $Zr(OR)_4$, $Zn(OR)_4$, $TiL_4$, $AlL_3$, $ZrL_4$, $ZnL_4$, $Ti(OCOR)_4$, $Al(OCOR)_3$, $Zr(OCOR)_4$, $Zn(OCOR)_4$, $(RO)_g TiL_{4-g}$, $(RO)_h AlL_{3-h}$, $(RO)_g ZrL_{4-g}$, or $(RO)_g ZnL_{4-g}$, L is at least one ligand selected from the group consisting of RCOCHCOR and RCOCHCOOR, R represents a substituted or unsubstituted monovalent hydrocarbon group of 1 to 10 carbon atoms, g represents a number of $0<g<4$, and
h is a number of $0<h<3$.

7. A pressure-sensitive adhesive tape, comprising a plastic film and a layer of a cured product of a silicone pressure-sensitive adhesive composition laminated to at least one surface of the plastic film, wherein the silicone pressure-sensitive adhesive composition is an addition reaction-curable silicone pressure-sensitive adhesive composition comprising:

(A) a polydiorganosiloxane comprising a linear polydiorganosiloxane (A1) and a linear polydiorganosiloxane (A2) having a mass ratio of (A1)/(A2) within a range from 90/10 to 10/90, in an amount of 20 to 80 parts by mass, wherein (A1) the linear polydiorganosiloxane (A1) comprises two or more alkenyl groups within each molecule, and (A2) the linear polydiorganosiloxane (A2) comprises SiOH groups at terminals thereof and no alkenyl groups, and is represented by formula (2):

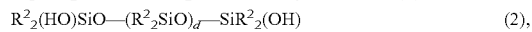

$$R^2_2(HO)SiO-(R^2_2SiO)_d-SiR^2_2(OH) \quad (2),$$

wherein $R^2$ represents identical or different monovalent hydrocarbon groups of 1 to 10 carbon atoms that contain no aliphatic unsaturated bonds, and d represents an integer that satisfies $500 \leq d \leq 20,000$;

(B) a polyorganosiloxane comprising $R^3_3SiO_{0.5}$ units, $SiO_2$ units and Si atom-bonded hydroxyl group-containing siloxane units, having a molar ratio of $R^3_3SiO_{0.5}$ units/$SiO_2$ units within a range from 0.5 to 0.9, wherein $R^3$ represents a monovalent hydrocarbon group of 1 to 10 carbon atoms, and containing the Si atom-bonded hydroxyl group in an amount of 0.1 to 5.0% by mass, in an amount of 80 to 20 parts by mass, provided that the combined total of the polydiorganosiloxane (A) and the polyorganosiloxane (B) is 100 parts by mass;

(C) a polyorganohydrogensiloxane comprising three or more SiH groups within each molecule, in an amount such that a molar ratio of SiH groups within the polyorganohydrogensiloxane (C) relative to alkenyl groups within the polydiorganosiloxane (A) is within a range from 0.5 to 20;

(D) a reaction retarder, in an amount within a range from 0 to 8.0 parts by mass per 100 parts by mass of a combination of the polydiorganosiloxane (A) and the polyorganosiloxane (B);

(E) a platinum group metal-based catalyst, in an amount sufficient to provide a mass of the platinum group metal equivalent to 1 to 5,000 ppm relative to a combined mass of the polydiorganosiloxane (A) and the polyorganosiloxane (B); and (F) a metal compound represented by a formula $MY_x$, wherein M represents a metal element having an atomic valence of 3 or 4 selected from the group consisting of aluminum, titanium, zirconium and zinc, x represents a number equal to the atomic valence of the metal element M, Y represents at least one ligand selected from the group consisting of RO, RCOO, RCOCHCOR and RCOCHCOOR, and R represents a substituted or unsubstituted monovalent hydrocarbon group of 1 to 10 carbon atoms, in an amount of 0.5 to 8 parts by mass per 100 parts by mass of a combination of the polydiorganosiloxane (A) and the polyorganosiloxane (B), wherein the polyorganosiloxane (B) is condensed with the linear polydiorganosiloxane (A2).

8. An addition reaction-curable silicone pressure-sensitive adhesive composition, consisting of:

(A) a polydiorganosiloxane comprising a linear polydiorganosiloxane (A1) and a linear polydiorganosiloxane (A2) having a mass ratio of (A1)/(A2) within a range from 90/10 to 10/90, in an amount of 20 to 80 parts by mass, wherein
(A1) the linear polydiorganosiloxane (A1) comprises two or more alkenyl groups within each molecule, and
(A2) the linear polydiorganosiloxane (A2) comprises SiOH groups at terminals thereof and no alkenyl groups, and is represented by formula (2):

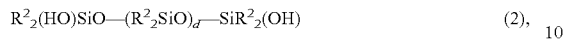
$$R^2_2(HO)SiO\text{—}(R^2_2SiO)_d\text{—}SiR^2_2(OH) \quad (2),$$

wherein $R^2$ represents identical or different monovalent hydrocarbon groups of 1 to 10 carbon atoms that contain no aliphatic unsaturated bonds, and d represents an integer that satisfies $500 \leq d \leq 20,000$;
(B) a polyorganosiloxane comprising $R^3_3SiO_{0.5}$ units, $SiO_2$ units and Si atom-bonded hydroxyl group-containing siloxane units, having a molar ratio of $R^3_3SiO_{0.5}$ units/$SiO_2$ units within a range from 0.5 to 0.9, wherein $R^3$ represents a monovalent hydrocarbon group of 1 to 10 carbon atoms, and containing the Si atom-bonded hydroxyl group in an amount of 0.1 to 5.0% by mass, in an amount of 80 to 20 parts by mass, provided that the combined total of the polydiorganosiloxane (A) and the polyorganosiloxane (B) is 100 parts by mass;
(C) a polyorganohydrogensiloxane comprising three or more SiH groups within each molecule, in an amount such that a molar ratio of SiH groups within the polyorganohydrogensiloxane (C) relative to alkenyl groups within the polydiorganosiloxane (A) is within a range from 0.5 to 20;
(D) a reaction retarder, in an amount within a range from 0 to 8.0 parts by mass per 100 parts by mass of a combination of the polydiorganosiloxane (A) and the polyorganosiloxane (B);
(E) a platinum group metal-based catalyst, in an amount sufficient to provide a mass of the platinum group metal equivalent to 1 to 5,000 ppm relative to a combined mass of the polydiorganosiloxane (A) and the polyorganosiloxane (B);
(F) at least one metal compound represented by a formula $MY_x$, wherein M represents a metal element having an atomic valence of 3 or 4 selected from the group consisting of aluminum, titanium, zirconium and zinc, x represents a number equal to the atomic valence of the metal element M, Y represents at least one ligand selected from the group consisting of RO, RCOO, RCOCHCOR and RCOCHCOOR, and R represents a substituted or unsubstituted monovalent hydrocarbon group of 1 to 10 carbon atoms, in an amount of 0.5 to 8 parts by mass per 100 parts by mass of a combination of the polydiorganosiloxane (A) and the polyorganosiloxane (B); and
(G) optionally at least one selected from the group consisting of a unreactive polyorganosiloxane, an antioxidant, a photostabilizer, a flame retardant, an antistatic agent, a solvent, a dye and a pigment,
wherein the polyorganosiloxane (B) is condensed with the linear polydiorganosiloxane (A2).

9. The composition of claim 8, wherein the composition consists of:
(A) the polydiorganosiloxane;
(B) the polyorganosiloxane;
(C) the polyorganohydrogensiloxane;
(D) the reaction retarder;
(E) the platinum group metal-based catalyst;
(F) the at least one metal compound; and
(G) at least one solvent.

10. The composition of claim 1, wherein the linear polydiorganosiloxane (A1), the linear polydiorganosiloxane (A2), and the polyorganosiloxane (B) are condensed.

11. The composition of claim 10, wherein the linear polydiorganosiloxane (A1), the linear polydiorganosiloxane (A2), and the polyorganosiloxane (B) are condensed in the presence of an alkaline catalyst.

12. A method, comprising curing the composition of claim 1.

* * * * *